US007849057B1

(12) United States Patent
Kazar et al.

(10) Patent No.: US 7,849,057 B1
(45) Date of Patent: Dec. 7, 2010

(54) IDENTIFYING SNAPSHOT MEMBERSHIP FOR BLOCKS BASED ON SNAPID

(75) Inventors: Michael Kazar, Pittsburgh, PA (US); Peter F. Corbett, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 790 days.

(21) Appl. No.: 11/694,110

(22) Filed: Mar. 30, 2007

(51) Int. Cl.
G06F 17/30 (2006.01)
(52) U.S. Cl. .................. 707/639; 707/637; 707/638
(58) Field of Classification Search ............... None
See application file for complete search history.

(56) References Cited

U.S. PATENT DOCUMENTS

| 4,570,217 | A |  | 2/1986 | Allen et al. |
| 5,124,987 | A |  | 6/1992 | Milligan et al. |
| 5,163,131 | A |  | 11/1992 | Row et al. |
| 5,202,979 | A |  | 4/1993 | Hillis et al. |
| 5,278,979 | A |  | 1/1994 | Foster et al. |
| 5,530,855 | A | * | 6/1996 | Satoh et al. .................. 707/201 |
| 5,581,724 | A | * | 12/1996 | Belsan et al. ............... 711/114 |
| 5,819,292 | A | * | 10/1998 | Hitz et al. .................... 707/203 |
| 6,061,770 | A | * | 5/2000 | Franklin ..................... 711/162 |
| 6,081,875 | A |  | 6/2000 | Clifton et al. |
| 6,341,341 | B1 |  | 1/2002 | Grummon et al. |
| 7,076,509 | B1 | * | 7/2006 | Chen et al. .......................... 1/1 |
| 7,111,021 | B1 | * | 9/2006 | Lewis et al. ........................ 1/1 |
| 7,127,577 | B2 |  | 10/2006 | Koning et al. |
| 7,409,494 | B2 | * | 8/2008 | Edwards et al. ............. 711/114 |
| 7,454,445 | B2 | * | 11/2008 | Lewis et al. ................. 707/205 |
| 7,587,431 | B1 | * | 9/2009 | Rao et al. .................... 707/202 |
| 2002/0083037 | A1 | * | 6/2002 | Lewis et al. ..................... 707/1 |
| 2005/0027748 | A1 |  | 2/2005 | Kisley |
| 2005/0066095 | A1 | * | 3/2005 | Mullick et al. .............. 710/200 |
| 2005/0138212 | A1 | * | 6/2005 | Yang ........................ 709/250 |
| 2005/0138312 | A1 |  | 6/2005 | Kubo et al. |
| 2005/0193245 | A1 | * | 9/2005 | Hayden et al. ................. 714/13 |
| 2005/0216535 | A1 |  | 9/2005 | Saika et al. |

(Continued)

OTHER PUBLICATIONS

Corbett et al., "File System Capable of Generating Snapshots and Providing Fast Sequential Read Access", U.S. Appl. No. 11/693,057, filed Mar. 29, 2007, 34 pages.

(Continued)

*Primary Examiner*—Neveen Abel Jalil
*Assistant Examiner*—Farhan M Syed
(74) *Attorney, Agent, or Firm*—Cesari and McKenna, LLP

(57) ABSTRACT

An on-disk structure of a file system has the capability to efficiently manage and organize data containers, such as snapshots, stored on a storage system. A multi-bit, monotonically increasing, snapshot identifier ("snapid") is provided that represents a snapshot and that increases every time a snapshot is generated for a volume of the storage system. The snapid facilitates organization of snapshot metadata within, e.g., a data structure used to organize metadata associated with snapshot data. In the illustrative embodiment, the data structure is a balanced tree structure configured to index the copy-out snapshot data blocks. The snapid is also used to determine which blocks belong to which snapshots. To that end, every block that is used in a snapshot has an associated "valid-to" snapid denoting the newest snapshot for which the block is valid. The oldest snapshot for which the block is valid is one greater than the valid-to field of the next older block at the same file block number.

30 Claims, 9 Drawing Sheets

U.S. PATENT DOCUMENTS

2005/0216788 A1* 9/2005 Mani-Meitav et al. ......... 714/6
2008/0059541 A1* 3/2008 Fachan et al. ............... 707/204

OTHER PUBLICATIONS

Corbett et al., "Maintaining Snapshot and Active File System Metadata in an On-Disk Structure of a File System", U.S. Appl. No. 11/693,061, filed Mar. 29, 2007, 37 pages.
Hitz, Dave et al., *File System Design for an NFS File Server Appliance*, Technical Report 3002, Rev. C395, presented Jan. 19, 1994.
Akyurek, Sedat, Placing Replicated Data to Reduce Seek Delays, Department of Computer Science, University of Maryland, UMIACS-TR-91-121, CS-TR-2746, Aug. 1991.
Bitton, Dina, Disk Shadowing, Proceedings of the 14th VLDB Conference, LA, CA 1988.
Chaudhuri, Surajit, et al., Self-Tuning Technology in Microsoft SQL Server, Data Engineering Journal 22, 2 1999 pp. 20-27.
Chutani, Sailesh, et al., The Episode File System, In Proceedings of the USENIX Winter 1992.
Coyne, Robert A., et al., Storage Systems for National Information Assets, Proc. Supercomputing 92, Minneapolis, Nov. 1992, pp. 626-633.
Finlayson, Ross S., et al., Log Files: An Extended File Service Exploiting Write-Once Storage Department of Computer Science, Stanford University, Report No. STAN-CS-87-1177, Sep. 1987.
Gray, Jim, et al., The Recovery Manager of the System R Database Manager, ACM Computing Surveys, (13)2:223-242 1981.
Hecht, Matthew S., et al. Shadowed Management of Free Disk Pages with a Linked List, ACM Transactions on Database Systems, 8/4, Dec. 1983, pp. 503-514.
Howard, John, H. et al., Scale and Performance in a Distributed File System, Carnegie Mellon University, CMU-ITC-87-068, Aug. 1987.
Howard, John H., An Overview of the Andrew File System, Carnegie Mellon University, CMU-ITC-88-062 1988.
Howard, John, H. et al., Scale and Performance in a Distributed File System, ACM Trans. Computer System, 6(1), Feb. 1988 pp. 51-81.
Kazar, Michael Leon, Synchronization and Caching Issues in the Andrew File System, Carnegie Mellon University, CMU-ITC-88-063.
Kazar, Michael L., et al., DEcorum File System Architectural Overview, USENIX Summer Conference, Anaheim, California, 1990.
Kemper, Alfons, et al., Performance Tuning for SAP R/3, Data Engineering Journal 22, 2 1999 pp. 33-40.
Kent, Jack et al., Optimizing Shadow Recovery Algorithms, IEEE Transactions on Software Engineering, 14(2): 155-168, Feb. 1988.
Kistler, et al., Disconnected Operation in the Coda File System, ACM Transactions on Computer Systems, vol. 10, No. 1, Feb. 1992, pp. 3-25.
Lorie, Raymond, A. Physical Integrity in a Large Segmented Database, ACM Trans. Database Syst., vol. 2, Mar. 1977, pp. 91-104.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.
Patterson, D., et al., A Case for Redundant Arrays of Inexpensive Disks (RAID), Technical Report, CSD-87-391, Computer Science Division, Electrical Engineering and Computer Sciences, University of California at Berkeley 1987.
Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.
Peterson, Zachary Nathaniel Joseph, Data Placement for Copy-on-Write Using Virtual Contiguity, University of CA, Santa Cruz, Master's Thesis for the Department of Science in Computer Science, Sep. 2002.
Quinlan, Sean, A Cached WORM File System, Software-Practice and Experience, 21(12):1289-1299 1991.
Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.
Rosenblum, Mendel, et al. The Design and Implementation of a Log-Structured File System Jul. 24, 1991 pp. 1-15.
Rosenblum, Mendel, The Design and Implementation of a Log-Structured File System, 1992 pp. 1-93.
Rosenblum, Mendel, et al., The Design and Implementation of a Log-Structured File System, In Proceedings of ACM Transactions on Computer Systems, (10)1:26-52, Feb. 1992.
Schiefer, Berni, et al., DB2 Universal Database Performance Tuning, Data Engineering Journal 22, 2 1999 pp. 12-19.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shasha, Dennis, Tuning Time Series Queries in Finance: Case Studies and Recommendations, Data Engineering Journal 22, 2 1999 pp. 41-47.
Sidebotham, Bob, Volumes: The Andrew File System Data Structuring Primitive, EEUG Conference Proceedings, Manchester, UK, Autumn 1986.
Subramanian, Muralidhar, et al., Performance Challenges in Object-Relational DBMSs, Data Engineering Journal 22, 2 1999 pp. 28-32.
Weikum, Gerhard, et al., Towards Self-Tuning Memory Management for Data Servers, Data Engineering Journal 22, 2 1999 pp. 3-11.
West, Michael, et al. The ITC Distributed File System: Prototype and Experience, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Non-Final Office Action, U.S. Appl. No. 11/693,061, mail date Aug. 27, 2009, 16 pages.
Final Office Action, U.S. Appl. No. 11/693,061, Mail Date Dec. 29, 2009, 23 pages.
Non-Final Office Action, U.S. Appl. No. 11/693,057, Mail Date Aug. 19, 2009, 16 pages.
Final Office Action, U.S. Appl. No. 11/693,057, Mail Date Dec. 16, 2009, 19 pages.

* cited by examiner

IDENTIFYING SNAPSHOT MEMBERSHIP FOR BLOCKS BASED ON SNAPID

CROSS-REFERENCE TO RELATED APPLICATION

The present invention is related to the following commonly assigned U.S. patent application Ser. Nos. 11/693,057, titled File System Capable of Generating Snapshots and Providing Fast Sequential Read Access and 11/693,061, titled Maintaining Snapshot and Active File System Metadata in an On-Disk Structure of a File System, each of which was filed on Mar. 29, 2007.

FIELD OF THE INVENTION

The present invention relates to file systems and, more specifically, to identification of snapshot membership for blocks in an on-disk structure of a file system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as directories and files on, e.g., the disks. When used within a SAN environment, the storage system may organize the information in the form of databases or files. Where the information is organized as files, the client requesting the information typically maintains file mappings and manages file semantics, while its requests (and system responses) address the information in terms of block addressing on disk using, e.g., a logical unit number.

Each "on-disk" file may be implemented as set of data structures, i.e., disk blocks, configured to store information, such as the actual data for the file. These data blocks are typically organized within a volume block number (vbn) space that is maintained by the file system. The file system may also assign each data block in the file a corresponding "file offset" or file block number (fbn) position in the file. The file system typically assigns sequences of fbns on a per-file basis, whereas vbns are assigned over a larger volume address space. That is, the file system organizes the data blocks within the vbn space as a volume; each volume may be, although is not necessarily, associated with its own file system. The file system typically consists of a contiguous range of vbns from zero to n, for a file system of size n−1 blocks.

The storage system may be further configured to operate according to a client/server model of information delivery to thereby allow many clients to access files stored on the system. In this model, the client may comprise an application, such as a database application, executing on a computer that "connects" to the storage system over a computer network, such as a point-to-point link, shared local area network, wide area network or virtual private network implemented over a public network, such as the Internet. The client typically communicates with the storage system by exchanging discrete frames or packets of data according to pre-defined protocols, such as the Transmission Control Protocol/Internet Protocol (TCP/IP). In addition, the client may request the services of the system by issuing file system protocol messages over the network to the storage system.

A file system may have the capability to generate a snapshot of its active file system. An "active file system" is a file system to which data can be both written and read, or, more generally, an active store that responds to both read and write operations. The snapshot is another form of a data container that refers to a copy of file system data that diverges from the active file system over time as the active file system is modified. Snapshots are well-known and described in U.S. patent application Ser. No. 09/932,578 entitled Instant Snapshot by Blake Lewis et al., now issued as U.S. Pat. No. 7,454,445 on Nov. 18, 2008, TR3002 File System Design for a NFS File Server Appliance by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though fully set forth herein.

A known file system implementation provides snapshots through "copy out" or "copy on write" operations. When updating a block with new file system data, the file system reads the data block from a previous (old) location on disk and writes that block to a new location prior to writing the updated block in-place at the old location. The active version of the file system thus remains contiguous and maintains its same layout on disk, while the snapshot versions are copied out and moved around on disk. However, a problem with the known copy-on-write operation implementation is that it renders each write operation expensive because of the amount of work that has to be performed for each operation, e.g., read the old data block, find a new location for the old data, store the old data in the new location and store the updated data in the old location.

SUMMARY OF THE INVENTION

The present invention overcomes the disadvantages of the prior art by providing an on-disk structure of a file system that has the capability to efficiently manage and organize data containers, such as snapshots, stored on a storage system. The on-disk structure also enables the file system to generate snapshots without the need to perform an expensive copy-on-write operation for every write operation directed to file system data, i.e., the file system is configured to perform such operations reasonably efficient. The on-disk structure arranges sequential portions of files on disk within regions, wherein each region comprises a predetermined amount of disk space represented by blocks and wherein the data of the file stored within each region may or may not be stored sequentially within the region. Notably, the on-disk structure accommodates a plurality of types of regions, including (i) active regions that contain active file system data for large files, (ii) snapshot regions that contain "copy-out" snapshot data for the large files and (iii) metadata regions that contain metadata, as well as directories and small files.

According to the invention, a multi-bit, monotonically increasing, snapshot identifier ("snapid") is provided that represents a snapshot and that increases every time a snapshot is generated for a volume of the storage system. The snapid facilitates organization of snapshot metadata within, e.g., a sorted data structure used to organize metadata associated with snapshot data. In the illustrative embodiment, the sorted data structure is a balanced tree structure configured to index the copy-out snapshot data blocks. The snapid is also used to determine which blocks belong to which snapshots. To that end, every block that is used in a snapshot has an associated "valid-to" snapid field denoting the newest snapshot for which the block is valid. The oldest snapshot for which the block is valid is one greater than the valid-to field of the next older block at the same file block number (fbn). If there is no next older block at the same fbn, the block is valid for all older snapshots.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
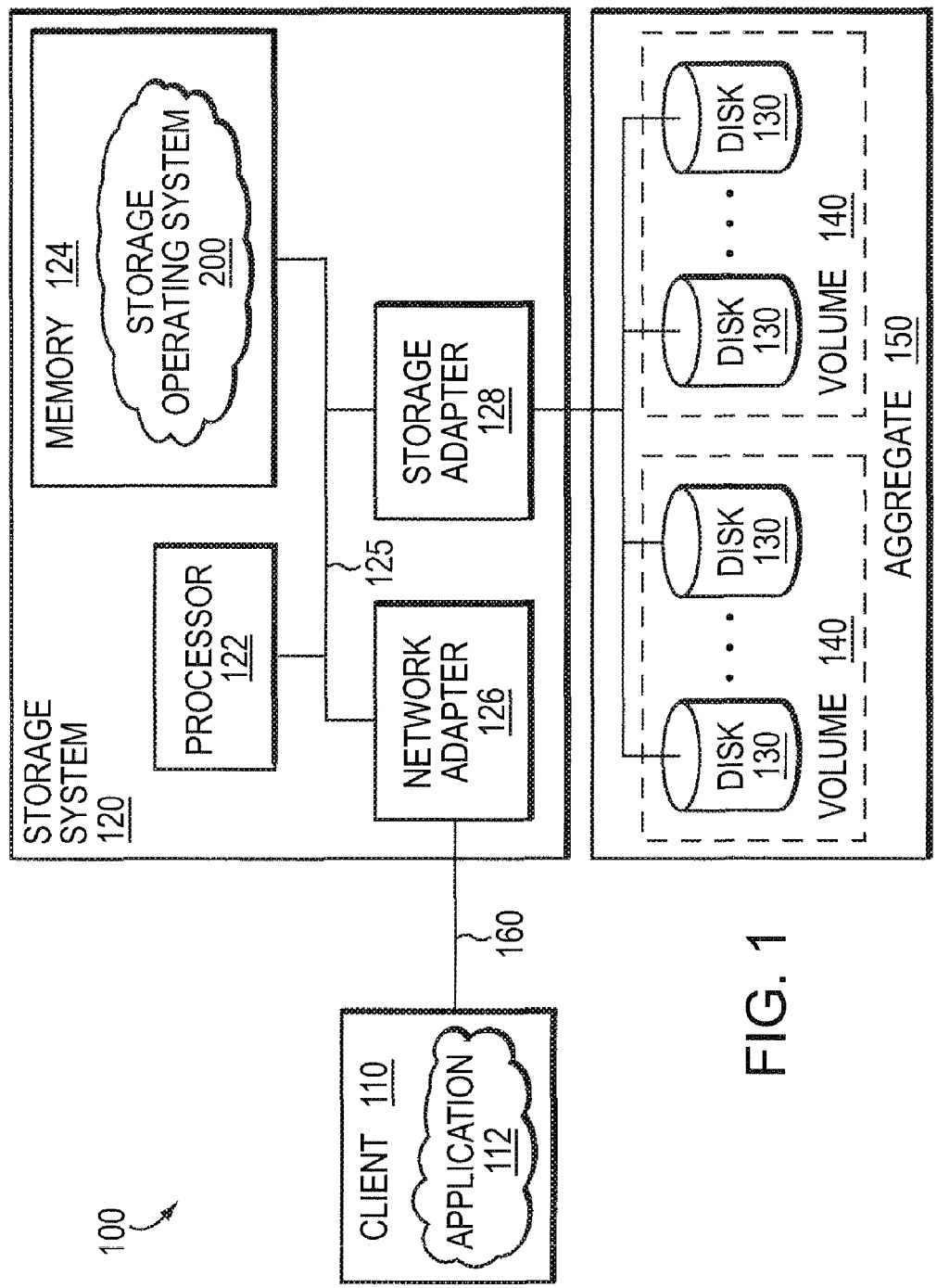
FIG. 1 is a schematic block diagram of an environment including a storage system that may be advantageously used with the present invention.

FIG. 1 is a schematic block diagram of an environment 100 including a storage system configured to provide storage services relating to the organization of information on writable persistent storage devices, such as disks 130. The storage system 120 is illustratively embodied as a computer comprising a processor 122, a memory 124, a network adapter 126 and a storage adapter 128 interconnected by a system bus 125. The storage system serves both file and block protocol access to information stored on the storage devices for users (system administrators) and clients of network attached storage (NAS) and storage area network (SAN) deployments. The storage system 120 provides NAS services through a file system and SAN services through SAN virtualization, including logical unit number (lun) emulation.

The memory 124 comprises storage locations that are addressable by the processor 122 and adapters 126, 128 for storing software programs and data structures associated with the embodiments described herein. The processor and adapters may, in turn, comprise processing elements and/or logic circuitry configured to execute the software programs and manipulate the data structures. A storage operating system 200, portions of which is typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the invention described herein.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. To that end, the client may utilize file-based access protocols when accessing information (in the form of files) over a NAS-based network. In addition, the client 110 may utilize block-based access protocols, such as the Small Computer Systems Interface (SCSI) protocol, when accessing information (in the form of blocks, disks or luns) over a SAN-based network.

The storage adapter 128 cooperates with the storage operating system 200 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel (FC) serial link topology. The information is retrieved by the storage adapter and, if necessary, processed by the processor 122 (or the adapter 128) prior to being forwarded over the system bus 125 to the network adapter 126, where the information is formatted into one or more packets and returned to the client 110.

Storage of information on the storage system 120 is preferably implemented as one or more storage volumes 140 that comprise one or more disks 130 cooperating to define an overall logical arrangement of volume block number (vbn) space on the volume(s). Each volume 140 is generally, although not necessarily, associated with its own file system. The disks within a volume/file system are typically organized as one or more groups, wherein each group may be operated as a Redundant Array of Independent (or Inexpensive) Disks (RAID). The volumes may be embodied as flexible (virtual) volumes and further organized as an aggregate 150. Aggregates and virtual volumes are described in U.S. patent application Ser. No. 10/836,817 titled EXTENSION OF WRITE ANYWHERE FILE SYSTEM LAYOUT, by John K. Edwards et al. and assigned to Network Appliance, Inc., now issued as U.S. Pat. No. 7,409,494 on Aug. 5, 2008, which is hereby incorporated by reference as though fully set forth herein.

To facilitate access to the disks 130, the storage operating system 200 implements a file system that logically organizes the information as a hierarchical structure of data containers, such volumes, files and luns, on the disks 130, to thereby provide an integrated NAS and SAN approach to storage by enabling file-based (NAS) access to the volumes and files, while further enabling block-based (SAN) access to the luns on a file-based storage platform. In an illustrative embodiment described herein, the storage operating system is the FreeBSD operating system kernel available from Network Appliance, Inc., Sunnyvale, Calif. that implements a Move Anywhere Proximate Layout (MAPL™) file system. However, it is expressly contemplated that any appropriate file is system can be used, and as such, where the term "MAPL" is employed, it should be taken broadly to refer to any file system that is otherwise adaptable to the teachings of this invention.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, a disk assembly directly-attached to a client or host computer and a distributed architecture of network and disk element nodes organized as a storage system cluster. The term "storage system" should therefore be taken broadly to include such arrangements in addition to any subsystems configured to perform a storage function and associated with other equipment or systems.

Figure 2:
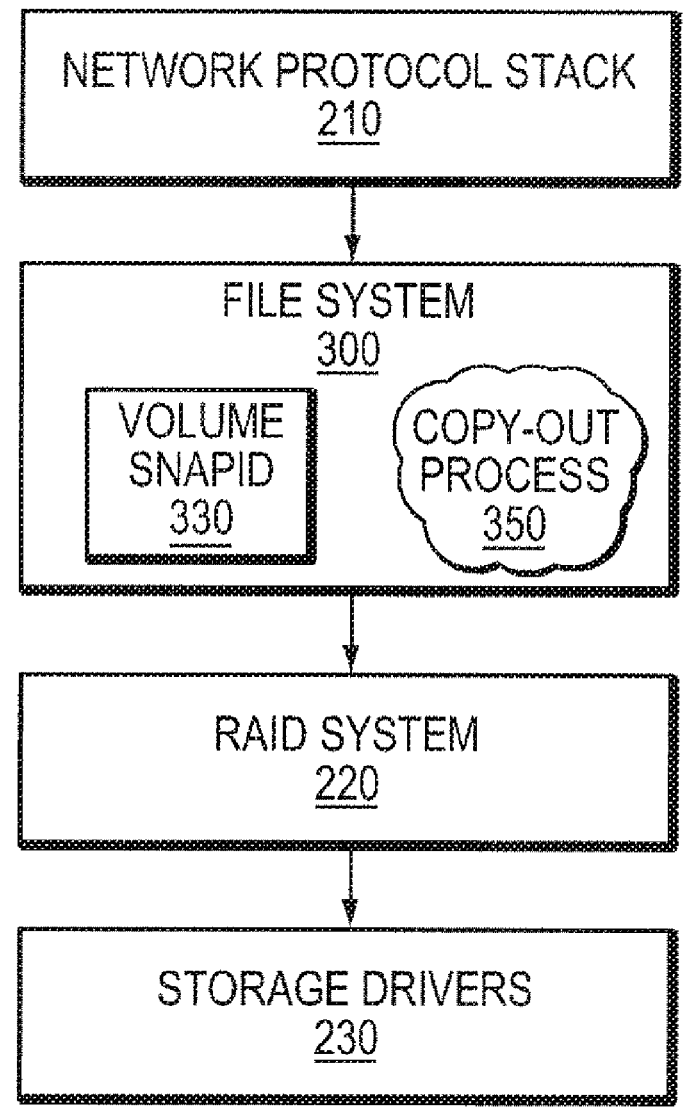
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack 210 that provides data paths for clients to access information stored on the storage system using block and file access protocols. The network protocol stack 210 illustratively includes a network driver layer (e.g., an Ethernet driver and a FC driver), a network protocol layer (e.g., an Internet Protocol layer and its supporting transport mechanisms, the is Transport Control Protocol layer and the User Datagram Protocol layer), and a file/block protocol server layer (e.g., a Common Internet File System server, a Network File System server, an iSCSI server, etc.). In addition, the storage operating system includes a RAID system layer 220 that implements a disk storage protocol, such as a RAID protocol, and a storage driver layer 230 that implements a disk access protocol such as, e.g., a SCSI protocol.

Disposed between the network protocol stack 210 and RAID system 220 is a file system layer 300 that implements a file system, such as the MAPL file system. The file system 300 is illustratively a journalled file system that is targeted to large file workloads and that has the capability to generate snapshots without the need to perform an expensive copy-on-write operation for every write operation directed to file system data, i.e., the file system is configured to perform such operations reasonably efficiently. The file system 300 has an on-disk format representation that is block-based using index nodes ("inodes") to identify files and file attributes (such as creation time, access permissions, size and block location). The file system also illustratively uses data structures to store metadata describing the layout of its file system; these metadata structures include, among others, an inode table.

An on-disk structure of the file system 300 provides fast sequential read access to data containers, such as files and snapshots. Illustratively, the file system apportions the storage space of storage devices, such as disks, into a plurality of regions and arranges sequential portions of files on disk within regions. Notably, the data of the files stored within each region may or may not be stored sequentially within the region. Each region comprises a predetermined amount of disk space represented by blocks, e.g., disk blocks. A space allocation map identifies those regions that are allocated and those regions that are available (free) for allocation. The space allocation map is illustratively embodied as a bit map and is organized on a region (e.g., 1 MB or larger) granularity, e.g., the allocation map includes one bit per region. Accordingly, the file system 300 allocates entire regions of disk space, wherein the regions can be designated for different purposes/roles. Illustratively, the designated role of a region can be discerned through examination of is certain inode metadata (or alternatively via an identifier that indicates its role).

Figure 3:
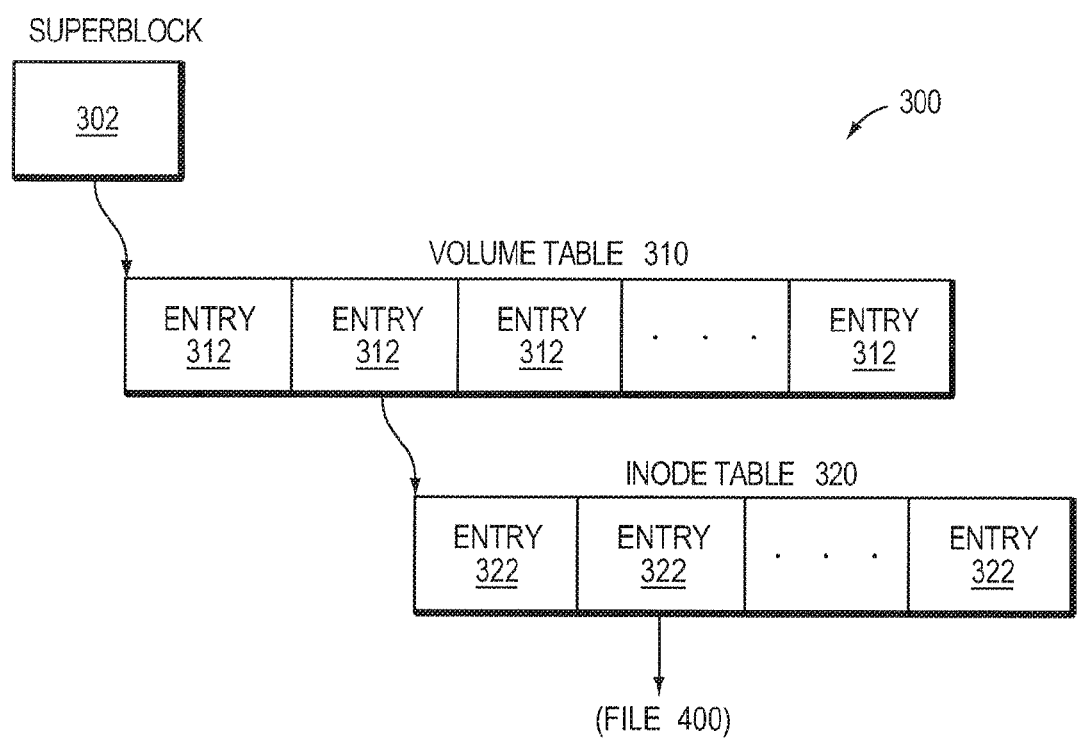
FIG. 3 is a schematic block diagram illustrating an on-disk structure of a file system that may be advantageously used in accordance with the present invention.

FIG. 3 is a schematic block diagram illustrating the on-disk structure of the file system 300 that may be advantageously used in accordance with the present invention. The file system structure includes a super block 302, one or more volume tables 310 and one or more inode tables 320. The super block 302 is a root block representing the root of an aggregate 150; the super block is stored at predefined locations on disk 130 and comprises various system wide configuration data. The volume table 310 is a data structure having a plurality of entries 312. Illustratively, there is one entry 312 for every volume 140 in the aggregate, e.g., there is one entry for every snapshot of every volume, as well an entry for the active file system/volume. Each volume table entry 312 includes an inode of a data structure, e.g., inode table 320, which includes all other inodes of the volume.

In an illustrative embodiment, snapshots are generated at the volume level (i.e., on a per volume basis). It should be noted that the term "snapshot" is used for purposes of this patent to designate a persistent consistency point image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI may comprise an active file system image that contains complete information about the file system, including all metadata. A PCPI can also include other information (metadata) about the active file system at the particular point in time for which the image is taken.

The present invention is directed to an on-disk structure of a file system that has the capability to efficiently manage and organize snapshots stored on a storage system. According to the invention, a multi-bit (e.g., 32-bit) monotonically increasing, snapshot identifier ("snapid") is provided that represents a snapshot and that increases every time a snapshot is generated for a volume 140. The eventual wrap-around of this multi-bit is number can be handled by a technique of ensuring that all snapshots older than a prescribed value have been deleted, allowing new snapshots to be created in the same number range. The file system issues and allocates snapids sequentially per volume, thereby enabling the file system to accommodate a substantially large number of snapshots per volume. In addition, the snapid facilitates organization of snapshot metadata within, e.g., an indirect block or other data structure used to organize metadata associated with snapshot data, as described further herein. The snapid is also used to determine which blocks belong to which snapshots. To that end, every block that is used in a snapshot has an associated "valid-to" snapid field denoting the newest snapshot for which the block is valid. The oldest snapshot for which the block is valid is one greater than the valid-to field of the next older block at the same file block number (fbn). If there is no next older block at the same fbn, the block is valid for all older snapshots. Thus, for example, if fbn 110 has a block that is valid to snapshot (snapid) 10 and another that is valid-to snapid 20, then all snapshots from snapids 11 to 20 include the block that is valid-to snapid 20. Note that a block can reside in multiple snapshots; however the file system stores only one number (ID) for each block.

When generating a snapshot of a volume, the file system 300 allocates a new volume table entry 312 for that snapshot. Assume the snapid is 17 when a snapshot is generated. The volume's snapid field is incremented to 18, and a new entry for the snapshot having a snapid 18 is allocated in the volume table 310 that points to the inode table 320 for that volume; accordingly, the snapshot (and allocated volume table entry) initially shares the inode table with the active file system. Thereafter, modifications are made to the active file system data within an active region of a file in the volume, as described below. As a result, the inode table 320 of the snapshot (snapid 17) starts to diverge from that of the active file system and, as a result, the snapshot forms its own inode table. However, the snapshot data remains intact in that region until a copy-out operation is performed to a snapshot region allocated to the file. Accordingly, each volume table entry 312 directly references (points to) the inode table 320 having a plurality of entries 322, each of which contains an inode identifying a file 400.

Figure 4:
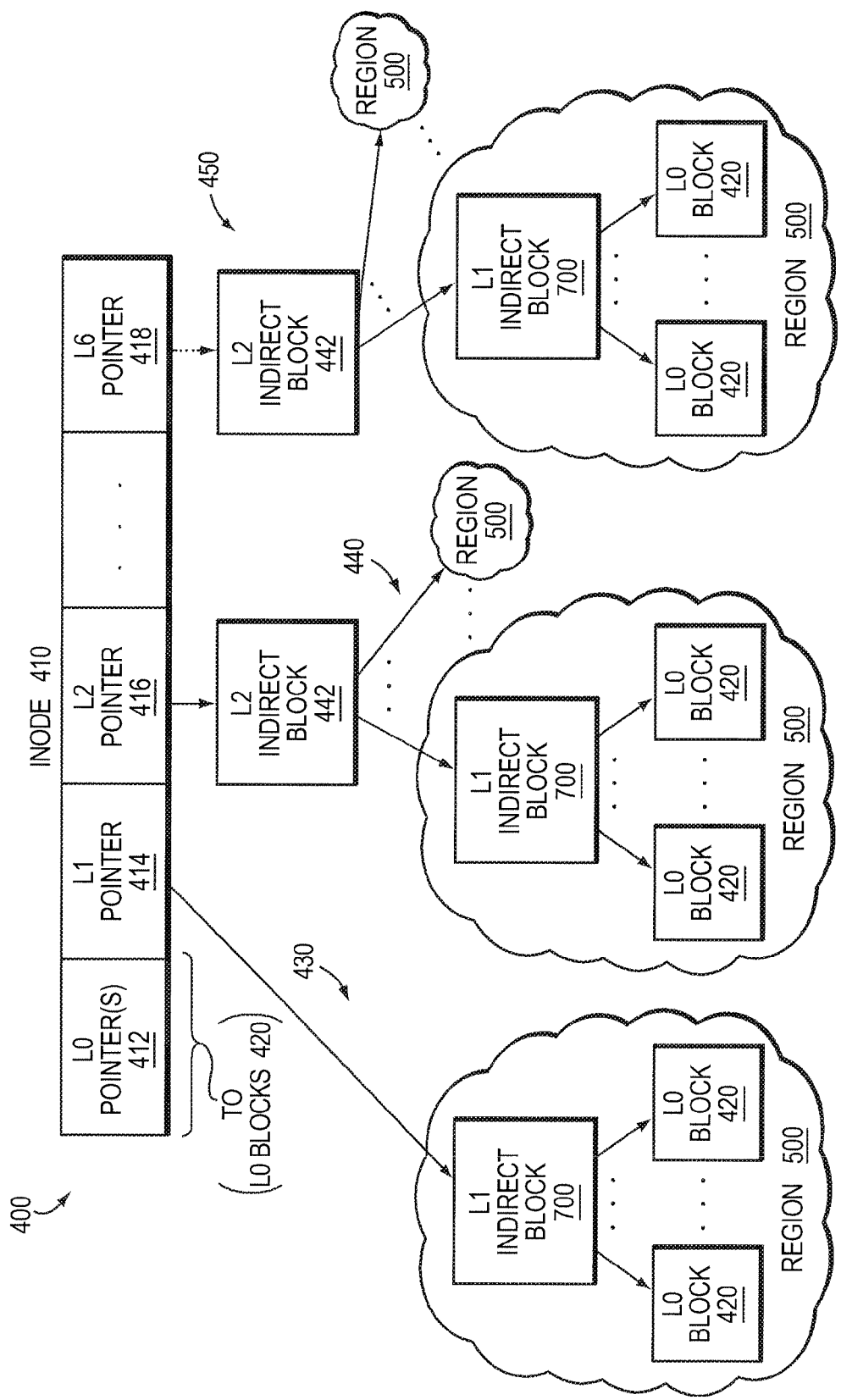
FIG. 4 is a schematic block diagram illustrating an on-disk structure of a file that may be advantageously used in accordance with the present invention.

FIG. 4 is a schematic block diagram illustrating the on-disk structure of a file 400 is that may be advantageously used in accordance with the present invention. It should be noted that the on-disk file structure described herein is used in an illustrative embodiment of the invention and that other file on-disk structures are possible, including a balanced indirect block tree structure. Each file in the file system 300 has a hierarchical tree structure of metadata (indirect blocks) that is rooted at an inode 410 from an entry 322 of the inode table 320. The hierarchical tree structure illustratively has a fan-out that accommodates a large file by adding a level of indirection from among a plurality of, e.g., six, different indirect block trees. Illustratively, the inode 410 of the file 400 may contain, among other things, one or more level 0 pointers 412 that reference direct (L0) data blocks 420. In addition, the inode 410 may contain a level 1 pointer 414 that references a level one (L1) indirect block 700 of a first indirect block tree 430 that includes, e.g., a plurality of L0 blocks 420; a level 2 pointer 416 that references a level two (L2) indirect block 442 of a second indirect block tree 440 that may include a plurality of L1 indirect blocks 700 and L0 blocks 420; etc. up to a level 6 pointer 418 that references a level six (L6) indirect block (not shown) of a sixth indirect block tree 450 that eventually may include a plurality of L2 indirect blocks 442, as well as L1 indirect blocks 700 and L0 blocks 420.

The size of the indirect blocks is illustratively selectable (i.e., not limited to a particular size), although each block pointer represents a predetermined (e.g., 64-bit) disk address. Depending upon the size of the file 400, the indirect block trees are filled, starting at the lowest indirect block tree level. For example, the first indirect block tree 430 can illustratively accommodate a file having up to 2000 blocks, the second indirect block tree 440 can accommodate a file having up to 4 million blocks and a third indirect block tree (not shown) can accommodate a file having up to 8 billion blocks. The structures of the indirect blocks (particularly above the L1 indirect block 700) are substantially similar, i.e., they include a list of pointers to other indirect blocks (at other levels). For instance, an L2 indirect block 442 may point to one or more L1 indirect blocks 700 or, in an alternate embodiment, may point to entire region 500 (that includes an L1 indirect block 700).

Figure 5:
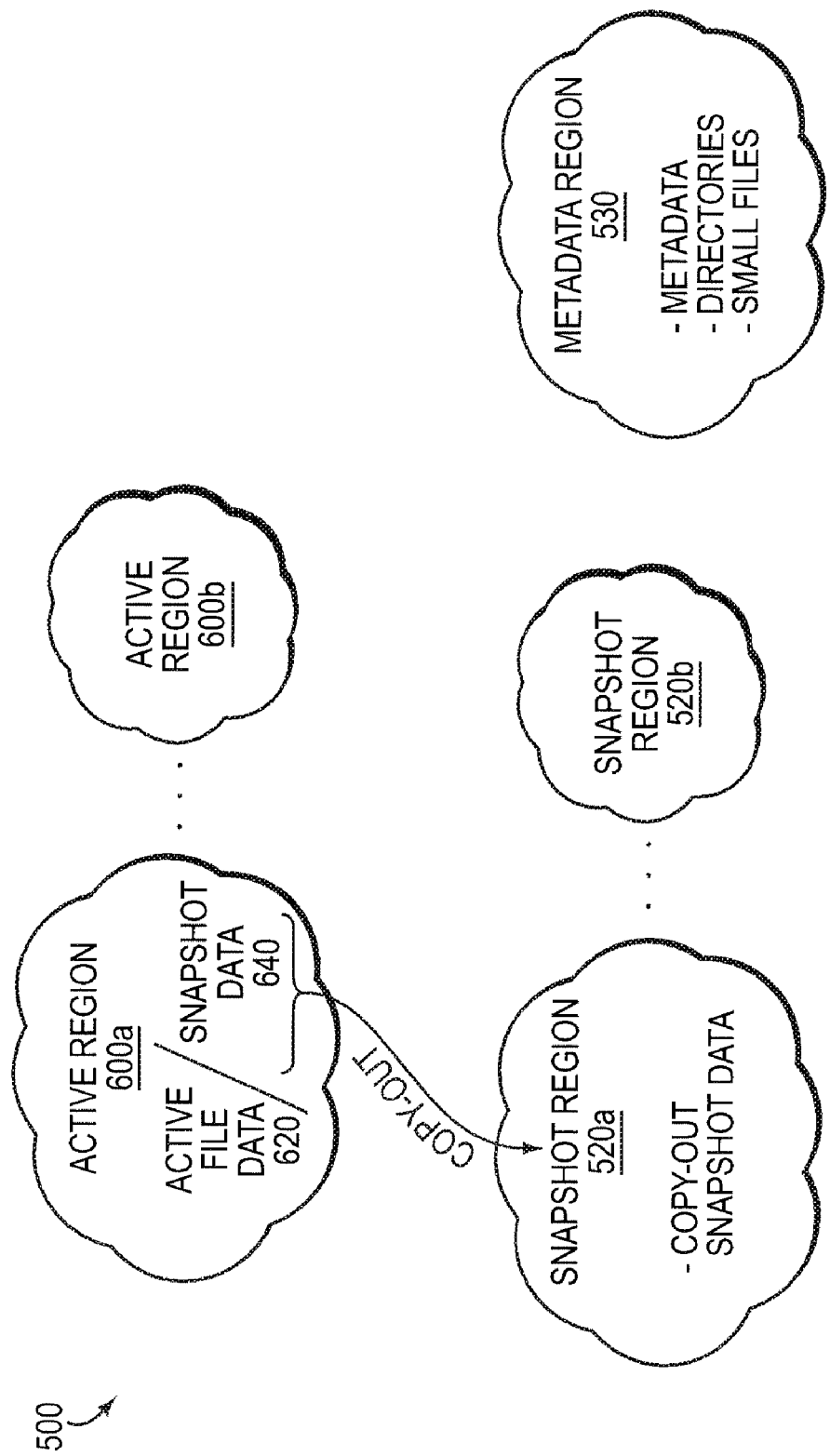
FIG. 5 is a schematic block diagram illustrating regions of disk space that may be advantageously used with the present invention.

FIG. 5 is a schematic block diagram illustrating regions 500 of disk space that may be advantageously used with the present invention. The on-disk structure accommodates a plurality of types of regions 500, including (i) active regions 600 that contain active file system data for large files, (ii) snapshot regions 520 that contain "copy out" snapshot data for the large files and (iii) metadata regions 530 that contain metadata, as well as directories and small files. Each active region contains a fixed range of a file, defined by a range of fbns. Each active region is at least as large as, and is typically somewhat larger than, the total size of the file fbn range to which it is mapped. Illustratively, the regions are of equal size (e.g., 1 MB) and the size of the disk blocks, such as L0 blocks 420, is chosen to correlate with the size of the file blocks used by the file system. Furthermore, the file block size is variable, e.g., 4 kB, 8 kB, 128 kB, etc., and can be chosen to match the block size used by a client application 112 or desired by an administrator.

In an illustrative embodiment, the file system 300 allocates an active region 600 in response to an event, such as a request to create or extend a large file 400 in which to store data associated with the file. According to the on-disk structure, a first portion 620 of the active region 600 is used to store active file system data for the file 400 (i.e., active data) and a second portion 640 is used to store snapshot data for the file. The first portion of the active region may be the contiguous first portion of the region, or may be assembled from disjoint portions of the region. Illustratively, the first portion 620 of the active region 600 comprises a substantial amount (e.g., 80%) of the disk space of the region, while the second portion 640 comprises the remaining amount (e.g., 20%) of the region 600. For example, if the active region comprises 1 MB of disk space, then the first portion 620 of the region may comprise 800 kB of disk space or, if the file block size is 4 kB, approximately 200 file blocks. Instead of mapping each 800 kB portion of the file to 800 kB of disk space, the file system 300 maps the 800 kB of the file to a larger region of disk space, e.g., a 1 MB region of disk space. Illustratively, the disk space of a region appears on one disk but that is not a requirement of the on-disk structure; that is, the disk space of a region can be apportioned and striped across multiple disks 130.

Broadly stated, if an L2 indirect block 442 points to an entire region 500, then there are no snapshots and no L1 indirect blocks for the region, i.e., this configuration obviates the need for L1 indirect blocks for the region. However, if an L2 indirect block 442 points to an L1 indirect block 700, then the indirect block 700 stores pointers to all active and snapshot blocks in the region. Illustratively, the L1 indirect block stores a pointer to the first portion 620 of the active region 600 used to store active file data and another pointer to the second portion 640 of the region used to store snapshot data. In addition, the L1 indirect block 700 stores an array of bits (e.g., a bit map), one per fbn contained in the region, indicating whether the corresponding disk block has been written since the most recent snapshot was generated, as described further herein.

Initially, the file system 300 allocates an empty, active region, e.g., active region 600a, for the file 400 and stores (writes) active data in allocated disk blocks of the first portion 620 of that region. The file system is illustratively capable of writing any file block to any available disk block location within the active region 600. That is, the 800 kB of active file data may appear anywhere in the active region, not necessarily at the first 800 kB or last 800 kB of disk space, and not necessarily sorted in order. As the active data in the region 600a ages, some of the data may only be stored in snapshots, as active data of the file is overwritten. New active data is written to blocks of the region that are still empty, leaving the old snapshot data in current block locations. Hence, the active data blocks of the file may gradually spread throughout the region and be interspersed with data blocks that still must be stored, but that are only stored in snapshots, i.e., in second portion 640 of the active region.

A snapshot of the file may be generated at any time; the resulting snapshot data is illustratively allocated on a per file basis within a region 600. The second portion 640 of the region may comprise the remaining 200 kB of disk space, e.g., 50 file blocks, which may also appear in any disk block location in the active region 600. However, it should be noted that the file system 300 does not maintain a fixed ratio of snapshot blocks to active blocks in an active region 600. In the illustrative embodiment, the maximum number of active blocks is limited to the number of different fbns covered by an L1 indirect block 700 associated with the region. The maximum number of snapshot blocks is limited by the size of the region −1, since at least one block in the region must be valid in the active file system. In practice, this limit is higher than necessary and, as such, the number of snapshot blocks in a region is restricted by limiting the size of a "snap cache" structure, described further herein, to some number of blocks, generally somewhat greater than the region size minus the file size mapped to the region.

The on-disk structure of the file system has the capability to maintain snapshot and file system metadata on a storage system. The snapshot and file system metadata for a region is maintained within L1 indirect blocks of the on-disk structure. Each L1 indirect block 700 describes (i.e., represents) a corresponding region 500 of the on-disk structure of the file system; in the case of an active region 600, e.g., an L1 indirect block 700 represents the active file data portion 620 of a large file. Each active region 600 also illustratively represents a contiguous space (or range) of fbns from a file perspective. For example, a first L1 indirect block represents the first 800 k bytes of the large file, a second L1 indirect block represents the next 800 k bytes of the file, etc. The L1 indirect block that references an active region also enables fbn-to-disk block number (dbn) mapping for the region. As a result, the L1 indirect block 700 is referred to as a "region indirect block" and is illustratively stored as the initial (root) block of its corresponding region 500. Storage of the region indirect block 700 within a corresponding region 500 is advantageous because most read and write operations require access (load/store) of the indirect block. However, the L1 indirect blocks can also be stored in metadata regions separately from the active regions they describe. Moreover, the L1 indirect blocks of more than one region can be stored in a single metadata region disk block. In addition, storage of the indirect block 700 with the data of the region may reduce disk head movement, thereby improving performance of the storage system.

The file system 300 allocates a second or subsequent active region, e.g., active region 600b, for the file 400 in response to writing (for the first time) a block representing a fbn position within the fbn range covered by an L1 indirect block 700 associated with that region. That is, in response to writing data to an fbn range of a file, the file system instantiates the L1 indirect block 700 representing the corresponding active region 600 prior to instantiating the actual region. Subsequently, the file system 300 allocates data blocks to which to write to within that region. Notably, this situation can occur before any previously allocated region, e.g., active region 600a, is fully populated.

Assume a block of the large file in the active region 600 has not been modified since a snapshot was generated, and now the file system 300 attempts to update the block with new active file data. However, assume further that the block is used in the previously generated snapshot and, thus, cannot be overwritten (i.e., must be maintained). As a result, the updated version of the block is written to a new disk block location of the same active region 600 allocated to the file 400, which new location is tracked (as part of the active file system) in the corresponding L1 indirect block 700. Illustratively, the L1 indirect block 700 keeps track of essentially all "accounting" information for the region, including whether a previous version of a block is in the snapshot and must be maintained.

Figure 6:
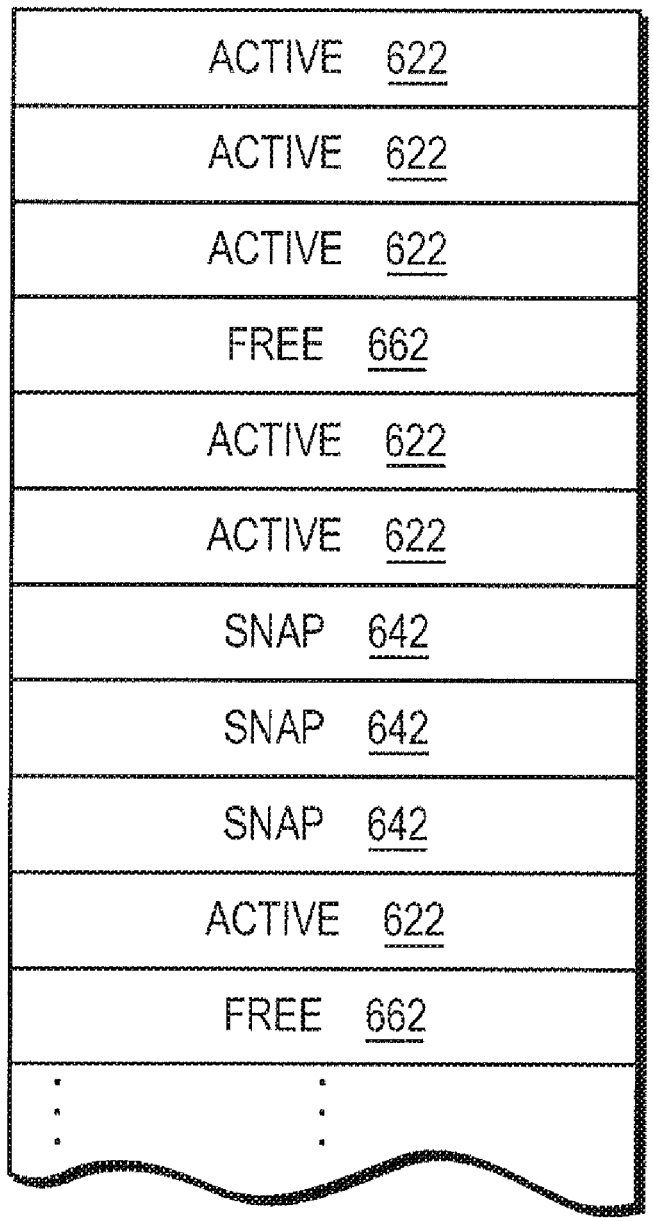
FIG. 6 is a schematic diagram illustrating the organization of an active region that may be advantageously used with the present invention.

FIG. 6 is a schematic diagram illustrating the organization of an active region 600 that may be advantageously used with the present invention. Illustratively, some blocks within the first portion 620 of the active region 600 are marked as being used in the active file system ("active 622"), some blocks within the second portion 640 of the region are marked as being used in one or more snapshots ("snap 642"), and some blocks are marked as being unallocated ("free 662"). Subsequent to generating a snapshot, if any active blocks 622 are overwritten within the active region, e.g., in accordance with write operations, and if one or more of those blocks is also required by a snapshot (i.e., it has yet to be overwritten since the most recent snapshot was generated), the block is preserved as is in its current vbn position of the region. The new version of the block is written to any free block space 662 within the active region 600. If there is no such space, a copy-out operation is performed to create empty space by removing all snap blocks 642 in the region belonging only to snapshots and that no longer belong to the active file system. If a block to be overwritten does not also belong to a snapshot, it can be overwritten in place.

One or more new active regions may be allocated to the file 400 as the file is extended. However, as the amount of snapshot data associated with the file grows, one or more snapshot regions 520 may be allocated to the file to store the snapshot data, which is "copied out" from the active region(s) 600. To that end, the file system 300 invokes a copy-out process 350 that gathers (reads) all blocks of the active region that are marked "snap", including the blocks that are about to be overwritten, and copies out (writes) the data of those blocks to the snapshot region. All blocks that have valid-to snapid values that are less than the next snapid of the file are eligible for copy-out. For maximum efficiency, the file system copies-out all of these blocks at once, which enables amortization of I/O operations required for the copy-out over the largest number of blocks. It is this amortization that reduces the impact of copy-out on file system performance. Note that all of these blocks are also recorded in the snap cache. As a result, the file may have a plurality of allocated regions, including active regions that contain active data and snapshot regions that contain snapshot data.

Referring again to FIG. 5, the file system 300 may allocate one or more snapshot regions 520 for the file, which region(s) is only used for storing snapshot data (i.e., copy-out data) that must be maintained for the snapshots. In an illustrative embodiment, a snapshot region 520 is allocated per file although, in an alternate embodiment, the on-disk structure may be extended to share snapshot regions among multiple files. The snapshot region 520 allocated to the file may hold snapshot data from any active region 600 allocated to the file. When the snapshot region fills, an additional snapshot region is allocated.

Illustratively, the copy-out process 350 of the file system 300 gathers up the snapshot data, e.g., 200 kB or 50 blocks, plus any other blocks in first active region 600*a* of the file that are about to be overwritten and that are in the most recent snapshot, and copies that data as a set to the snapshot region (e.g., a first snapshot region 520*a* for the file). As a result, there are at least 50 "free" blocks in the first active region 600*a* that can be used for a next series of snapshots in that region. When those free blocks become populated with new active data, another 50 blocks in the region will contain only snapshot data and can be copied out. These blocks are illustratively written to the first snapshot region 520*a*, starting at a disk location where the previous set of snapshot data ended. Likewise, when the second active region 600*b* becomes fully populated (e.g., 800 kB or 200 blocks of active file data and 200 kB or 50 blocks of snapshot data), the snapshot blocks are gathered and copied-out as a set to the first snapshot region 520*a* of the file. Once the is first snapshot region becomes fully populated with copy-out data, a second snapshot region 520*b* is allocated to the file. Notably, there is some locality present among the sets of snapshot data stored in each snapshot region, since the region is populated with sets of, e.g., 50, snapshot blocks at a time. Accordingly, the copy-out data is not substantially fragmented over one or more disks 130, thereby improving sequential read operation performance for snapshots.

As noted, the L1 indirect block 700 keeps track of accounting information for its region; in the case of an active region 600, the L1 indirect block 700 keeps track of the contents of that region, including active file system data and snapshot data. When a copy-out operation is performed, the file system 300 updates metadata used to keep track of all snapshot data that has been copied out to a snapshot region 520 of a file. As described further herein, the file system 300 instantiates and maintains a sorted data structure, e.g., a B-tree structure, for each file that organizes the metadata associated with the copied-out snapshot data. Thus, according to the on-disk structure of the file system, each file 400 has an active tree structure comprising an inode and indirect blocks that reference data blocks configured to store active file data and snapshot data within an active region 600, as well as a B-tree structure that keeps track of all copied-out snapshot data for the file.

Figure 7:
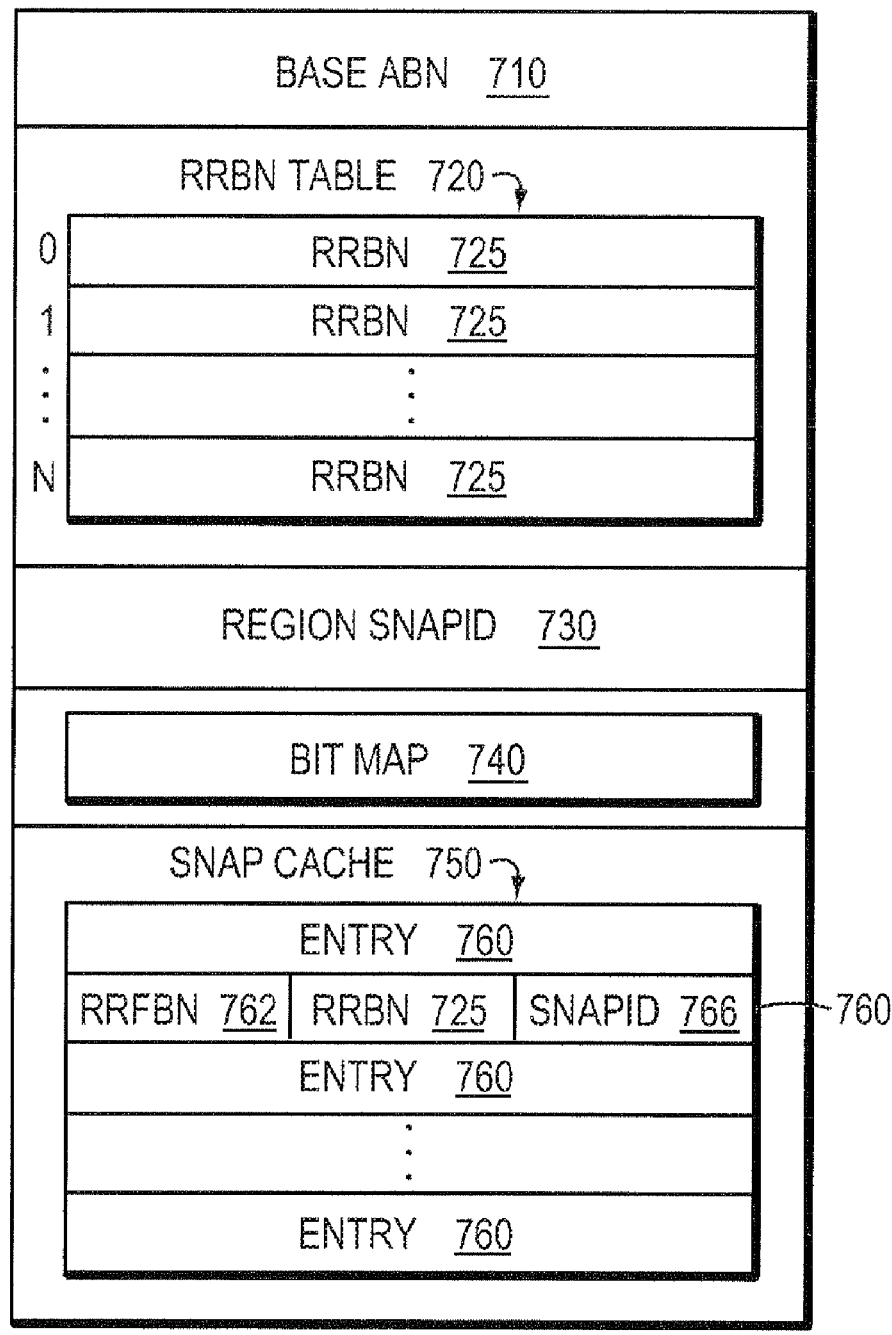
FIG. 7 is a schematic block diagram of the internal structure of a level 1 indirect block in accordance with the present invention.

FIG. 7 is a schematic block diagram of the internal structure of an L1 indirect block 700 that may be advantageously used with the present invention. Each L1 indirect block 700 is configured to completely describe a region 500 of an aggregate 150 and, to that end, contains descriptive information of the region. For example, the L1 indirect block 700 has a base aggregate block number (ABN) field 710 that holds an identifier that uniquely identifies a region in the aggregate 150. The identifier is illustratively a base ABN that references the region. Note that each region 500 of an aggregate 150 may to be numbered sequentially or, as in the illustrative embodiment, may be assigned an address that expresses a byte position in the aggregate. In the latter case, the base ABN address 710 is a multi-bit (e.g., 64-bit) disk address of a first byte in a region of the aggregate.

A field 720 of the LI indirect block 700 is organized as a data structure (e.g., a table) having a plurality of (e.g., 0-N) entries, each of which stores a region relative block number (RRBN 725). The entries of the RRBN table 720 essentially provide mappings between fbns and dbns within a region (e.g., the RRBN 725). RRBNs are employed because the active data of a file stored in the first portion 620 of an active region 600 is not necessarily contiguous. Note that the range of fbns for the active file data is stored in an indirect block tree (e.g., indirect block tree 800) and, as such, the position of an fbn in the indirect block tree specifies the location of the data in a file within the fbn range covered by a single active region.

The L1 indirect block 700 also has a field 730 that stores a value indicative of the last snapshot to be taken at a point in time when any block in its active region 600 was last written, i.e., a "region snapid 730". Storage of the region snapid 730 in the indirect block 700 ensures that, when a snapshot is taken, the file system 300 does not need to update the content of every indirect block. Note that file system 300 maintains an additional container snapid value, e.g., a "volume snapid" 330, adapted to keep track of the last snapshot (or "most recent snapshot") to be taken when any block in an entire container, e.g., a volume 140, was last written. Note also that the container snapid may be adapted to apply to any type and size of container, e.g., individual files, collection of files (as in a directory), collections of volumes, etc., for which a snapshot may be taken.

A field 740 of the L1 indirect block 700 is organized as a data structure that stores information pertaining to fbns that have been overwritten since the last snapshot. The data structure is illustratively embodied as a bit map 740 containing a plurality of (e.g., 800) bits representing a range of (e.g., 800) file blocks and that identifies those fbns within the range that have been overwritten since the last snapshot (identified by the region snapid 730). That is, the L1 indirect block 700 stores an array of bits, one per fbn contained in the region, indicating whether or not the corresponding disk block has been overwritten within the region. Note that the snapshot identified by the region snapid 730 may not be the last snapshot taken of the volume, but rather identifies the last snapshot taken when any block of the region 600 was changed.

Notably, when the values of the region snapid 730 and volume snapid 330 match, the bit map 740 is valid. If the volume snapid 330 is greater than the region snapid 730, then no blocks in the region 600 were modified (written) since the last snapshot of the volume was taken and the bit map 740 is invalid and, thus, ignored. Accordingly, the bits of bit map 740 are valid in the interval beginning from when the region snapid 730 matches the volume snapid 330 until the volume snapid next changes, e.g., the point at which the volume snapid 330 is updated.

In an illustrative embodiment, the bit map 740 is used to determine whether or not to keep a block that is overwritten. For example, an unasserted (e.g., zero) bit of the bit map 740 may denote that the corresponding block has not yet been overwritten, but that the block is in a snapshot and, therefore, the file system 300 should maintain that block. On the other hand, an asserted (e.g., one) bit may denote that the corresponding block has been overwritten since the last snapshot and that the file system 300 can overwrite it again because its previous "old" data is not preserved in a snapshot. Once a new snapshot is taken of the volume 140, changing the volume snapid 330 logically (and instantly) clears all bit maps 740 in all L1 indirect blocks 700 in an atomic manner, which is efficient because the file system does not have to update (individually process) any of those indirect blocks. The bit map is physically cleared the next time the region indirect block is modified, at which point the region snapid is also changed to match the volume snapid. At this time, at least one bit in the bit map is also set, corresponding to a block that has just been written.

The L1 indirect block 700 also includes a field 750 organized as a data structure that illustratively records (marks) the use of each disk block in a snapshot of an active region 600.

The data structure is a "snap cache" structure 750 illustratively embodied as a table having a plurality of entries 760. The snap cache also has a field to record a value indicating a count (e.g., 0-N) of used (allocated) entries of the table. For example, every time a block is overwritten, an entry 760 is created in the snap cache 750 and the count of allocated entries is incremented. The count keeps incrementing with subsequent overwritten blocks until either the snap cache table 750 is filled or the active region 600 is filled, at which point a copy-out operation of the snapshot data is performed. If exactly filled, the copy-out operation can be further delayed until a subsequent write is performed to the region. Of course, copy-out can be performed earlier than required, but this will reduce the amount of disk I/O and positioning amortization achieved in the copy-out process.

In the illustrative embodiment, each entry 760 in the table 750 has three (3) subfields: (i) a first sub-field that holds a region relative fbn (RRFBN) 762, (ii) a second sub-field that holds a RRBN 725 and (iii) a third sub-field that holds a snapid 766. The entries 760 of the snap cache table 750 pertain to blocks that only appear in snapshots (i.e., that are no longer active), but that are still in the region 600. For example, when a block is overwritten in an active region but is still in a snapshot, an entry 760 is created in the snap cache 750 that contains (i) the RRFBN 762 of the block, (ii) the RRBN 725 of the block (obtained via the mapping table 720) and (iii) the snapid 766 up to which the block is valid (i.e., "valid-to-snapid"). The valid-to-snapid 766 is illustratively the volume snapid of the last snapshot taken. This snapid is also written into the region snapid 730 when the region indirect block 700 is updated. Storage of RRFBNs and RRBNs saves space in the region indirect block, but it will be understood to those of skill in the art that the teachings of the invention may be applied to storage of full fbns and region block number (rbns).

The snap cache table 750 can be configured as large as needed but, in the illustrative embodiment, is configured with at least 50 entries to record at least 50 snapshot blocks to thereby accommodate the 50 blocks in the second portion 640 of an active region 600 (i.e., the remaining 200 kB of disk space) that contain snapshot data. Once the snapshot data is copied out of an active region and the entire L1 indirect block 700 is rewritten, the snap cache 750 is cleared. Specifically, all of the accounting information in the snap cache 750 is transferred to the B-tree, which describes all of the copied out data.

According to the present invention, the B-tree is configured to index copied-out snapshot data blocks. Once copied-out from an active region 600 to a snapshot region 520, a block of snapshot data is referenced by the B-tree. In the on-disk structure, every file (inode) has both a regular indirect block tree (described above) and a B-tree for all its copied-out blocks. The B-tree is initially empty and is not instantiated until a first copy-out operation is performed, at which time a first B-tree node is added. In the illustrative embodiment, the inode stores the number of levels of the B-tree and a pointer to the root of the B-tree. Initially, at level 0, there is no B-tree root; the root does not get allocated until the first copy out operation for the file.

Assume that the volume snapid 330 of a volume 140 is, e.g., 17 and a first block is modified (written) in an active region 600 so that the region snapid 730 is 17, as is the valid-to-snapid 766 (=17) for the first block. A series of snapshots is then generated for the volume 140, such that the volume snapid changes from 18, 19 to 20. Thereafter, a second block in the region 600 is written such that the region snapid (last written) becomes 20 and the overwritten block is valid-to snapid of 20. However, the first block of the region is still only valid-to snapid 17. If that first block is overwritten again, there are two entries 760 for the same fbn 762 in the table 750, one that is valid-to snapid 20 and the other that is valid-to snapid 17. According to the on-disk structure of the file system, there can be multiple snapshot versions of the same block in the same region.

Figure 8:
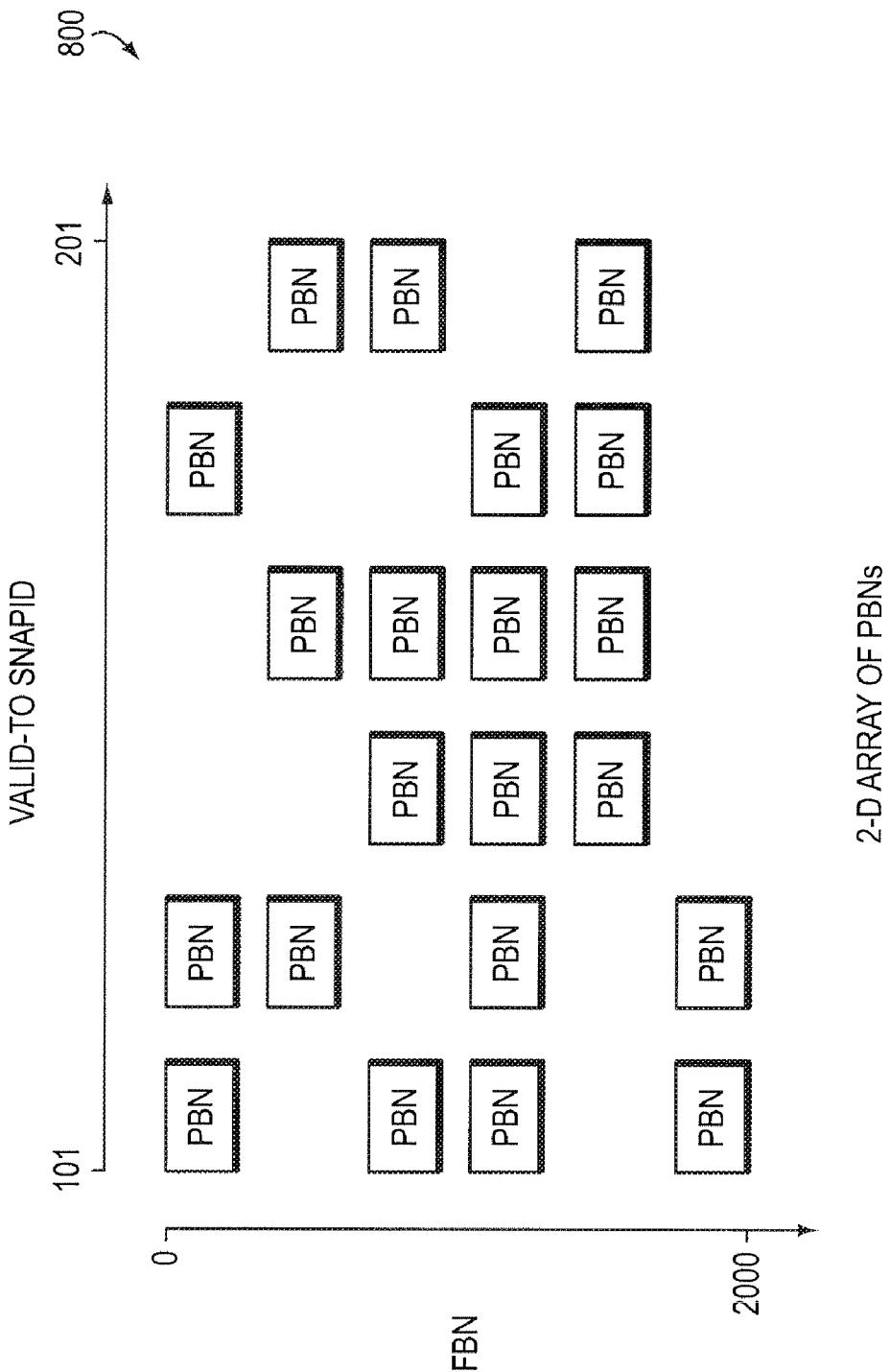
FIG. 8 is a schematic block diagram illustrating contents of a B-tree associated with a file in accordance with the present invention.

FIG. 8 is a schematic block diagram illustrating contents of a B-tree associated with a file in accordance with the present invention. The contents of the B-tree are illustratively organized as a two dimensional array (e.g., table 800) of block numbers on disk (pbns) that is indexed by, e.g., fbn and valid-to snapid. Note that the valid-to snapids are similar to those snapids stored in the snap cache table 750. In the fbn dimension for the file, the fbn range is 0 to the file size, e.g., 0 to 2000. The valid-to snapid dimension for the file ranges from an initial value of the snapid for a volume 140 when the file was first created to a current value of the snapid for the volume, e.g., 101 to 201. The table 800 contains fairly sparse information because the on-disk block number of an fbn may be to consistent (i.e., assume a similar value) across a row of the table in each of a first series of snapshots until it changes to another value, i.e., changes identity. Notably, there may be long periods where the on-disk block number does not change identity, even across multiple snapshots. Therefore, it is desirable to compress this information.

Figure 9:
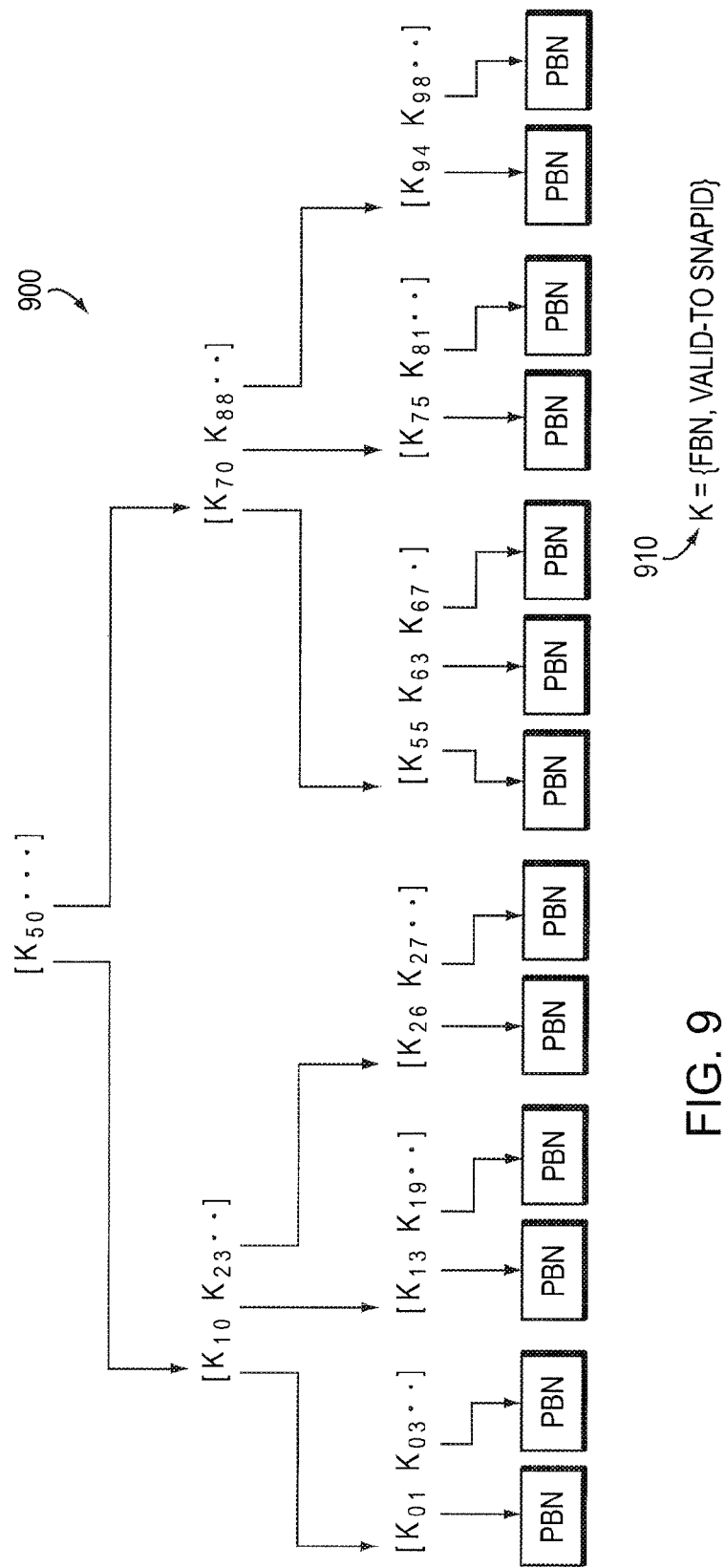
FIG. 9 is a schematic block diagram of a B-tree that may be advantageously used with the present invention.

In the illustrative embodiment, the information depicted in the table is stored as a is B-tree data structure to organize the information more densely. According to the invention, the B-tree records a value of a snapid when a particular block changes identity. The determination of which block to use can be reconstructed for any snapshot by examining the point at which the block changed identity. FIG. 9 is a schematic block diagram of a B-tree that may be advantageously used with the present invention. The B-tree 900 is illustratively indexed by a key $K_{xy}$ (K 910) that comprises a combination of an fbn and a snapid, i.e., a valid-to snapid.

Broadly stated, the B-tree 900 is a balanced tree structure, wherein a top-level of the tree specifies that everything below it (within a specified range of fbns) is valid up to a specified snapid. A next level of the tree only deals with fbns of another specified range within another valid-to snapid range. Eventually, a bottom-level of the B-tree points to individual disk blocks (pbns) and, in particular, specifies the fbns of the pbns, as well as the valid-to snapids of those pbns. Ultimately, there is one "leaf" entry in the B-tree 900 for every block that has ever been used by the file and that has been copied out of an active region to a snapshot region.

In the illustrative embodiment, the B-tree does not consider the snapid separate from the block number. This enables indexing into the B-tree to search for a particular block (fbn) and to determine the latest snapid that has a copy of that fbn in a relatively efficient manner. If a copy-out on that fbn has never been performed, the fbn is not found on the B-tree so the file system 300 searches the active regions 600 for that block. In other words, the fbn could still be in a snapshot that is still in an active region (it just has not yet been copied-out). In addition, the fbn might be an active block that has not changed in the last few snapshots and, accordingly, is valid. Note also that the valid-to snapid of such an active block is the next snapshot that will be taken, i.e., the block is to valid-to some point in the future which has not yet been determined.

While there have been shown and described illustrative embodiments of an on-disk structure of a file system that has the capability to maintain snapshot and file system metadata on a storage system, it is to be understood that various other adaptations and modifications may be made within the spirit and scope of the present invention. For example, it will be understood to those skilled in the art that the sizes of the multi-bit identifiers (e.g., snapid), addresses (e.g., base ABN address, disk address space), and block numbers (e.g., RRBN) can vary to accommodate various sizes of identifiers, addresses/address spaces, block numbers and regions and that the examples used herein are employed solely for illustrative purposes.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing and organizing snapshots stored on a storage system, comprising:
   storing data in a plurality of volumes on the storage system;
   generating a snapshot for a selected volume of the plurality of volumes;
   allocating a snapshot identifier (snapid) for the selected volume, the snapid comprising an identifier that represents the snapshot and increases when another snapshot is generated for the selected volume;
   organizing metadata associated with snapshot data stored in one or more blocks of the snapshot within a data structure, wherein a particular field in the metadata indicates a most recent snapshot taken at a point in time when any block in an active region in a file system executing on the storage system was last written;
   denoting, by reading the snapid at a snapid field in the metadata for each block that is used in the snapshot, a newest snapshot for which each block is valid; and
   determining which blocks are valid for each snapshot using the snapid read from the snapid field.

2. The method of claim 1 further comprising:
   instantiating the data structure in response to a copy-out operation of the snapshot data performed by the file system.

3. A system configured to manage and organize snapshots stored on a storage system, comprising:
   a plurality of volumes operatively connected to the storage system of the plurality of volumes configured to store data;
   a storage operating system configured to execute on the storage system, the storage operating system further configured to generate a snapshot for a selected volume of the plurality of volumes and allocate a snapshot identifier (snapid) for the selected volume, the snapid comprising an identifier that represents the snapshot and increases when another snapshot is generated for the selected volume, the storage operating system further configured to organize metadata associated with snapshot data stored in one or more blocks of the snapshot within a data structure, wherein a particular field in the metadata is configured to indicate a most recent snapshot taken at a point in time when any block in an active region in a file system executing on the storage system was last written; and
   a snapid field in the metadata for each block that is used in the snapshot, the snapid filed configured to store the snapid to denote a newest snapshot for which each block is valid, wherein the storage operating system is further configured to determine which blocks are valid for each snapshot using the snapid from the snapid field.

4. The system of claim 3 wherein the data structure is a sorted data structure.

5. The system of claim 3 further comprising a container snapid value configured to keep track of a most recent snapshot to be generated when any block in the selected volume was last written.

6. The system of claim 3 wherein the data structure is a balanced tree (B-tree) configured to index the one or more blocks storing the snapshot data.

7. The system of claim 3 wherein the data structure is instantiated in response to a copy-out operation of the snapshot data performed by the storage operating system.

8. The system of claim 3 wherein a first node is added to the data structure in response to a copy-out operation.

9. The system of claim 3 further comprising a copy-out process of the storage operating system configured to perform a copy-out operation.

10. The system of claim 9 wherein the copy-out operation copies the snapshot data from the active region of an on-disk structure of the file system to a snapshot region of the on-disk structure.

11. The system of claim 6 wherein the B-tree is configured to record a value of the snapid when a particular block changes identity.

12. The system of claim 11 wherein the B-tree is further configured to facilitate determination of which block to use for any snapshot by examining a point at which the particular block changes identity.

13. The system of claim 3 wherein the data structure is indexed by a key comprising a combination of a block number and the snapid.

14. The system of claim 13 wherein the block number is a file block number.

15. The system of claim 14 wherein the snapid is a valid-to snapid.

16. An apparatus configured to manage and organize snapshots stored on a storage system, comprising:
   means for storing data in a plurality of volumes on the storage system;
   means for generating a snapshot for a selected volume of the plurality of volumes;
   means for allocating a snapshot identifier (snapid) for the selected volume, the snapid comprising an identifier that represents the snapshot and increases when another snapshot is generated for the selected volume;
   means for organizing metadata associated with snapshot data stored in one or more blocks of the snapshot within a data structure, wherein a particular field in the metadata indicates a most recent snapshot taken at a point in time when any block in an active region in a file system executing on the storage system was last written;
   means for denoting, by reading the snapid at a snapid field in the metadata, for each block that is used in the snapshot, a newest snapshot for which each block is valid; and
   means for determining which blocks are valid for each snapshot using the snapid read from the snapid field.

17. A computer readable storage medium containing executable program instructions executed by a processor, comprising:

program instructions that store data in a plurality of volumes on the storage system;

program instructions that generate a snapshot for a selected volume of the plurality of volumes;

program instructions that allocate a snapshot identifier (snapid) for the selected volume, the snapid comprising an identifier that represents the snapshot and increases when another snapshot is generated for the selected volume;

program instructions that organize metadata associated with snapshot data stored in one or more blocks of the snapshot within a data structure, wherein a particular field in the metadata indicates a most recent snapshot taken at a point in time when any block in an active region in a file system executing on the storage system was last written;

program instructions that denote, by reading the snapid at a snapid field in the metadata, for each block that is used in the snapshot, a newest snapshot for which each block is valid; and program instructions that determine which blocks are valid for each snapshot using the snapid read from the snapid field.

18. The computer readable storage medium of claim 17 further comprising:

program instructions that instantiate the data structure in response to a copy-out operation of the snapshot data performed by the file system.

19. The computer readable storage medium of claim 18 further comprising program instructions that record a value of the snapid in the data structure when a particular block changes identity.

20. The method of claim 1 further comprising indicating, by a region snapid value, the most recent snapshot to be taken at the point in time when any block in the active region was last written.

21. The method of claim 20 further comprising tracking, by a container snapid value, a most recent snapshot to be taken when any block in a particular volume of the plurality of volumes was last written.

22. The method of claim 21 further comprising determining a bit map is valid in response to a match between the region snapid and the container snapid.

23. The method of claim 1 further comprising indexing the data structure using a key comprising a combination of a block number and the snapid.

24. The method of claim 1 further comprising examining a point at which a particular block changes identity to facilitate determination of which block to use for any snapshot.

25. The method of claim 1 further comprising indexing, by the data structure, the one or more blocks storing the snapshot data, wherein the data structure is a balanced tree (B-tree).

26. The method of claim 1 wherein the data structure comprises a region relative file block number field, a region relative block number field, and the snapid field.

27. The method of claim 1 further comprising writing the snapid into a region snapid in response to updating a region indirect block.

28. The system of claim 3 further comprising a bit map, a region snapid, and a container snapid, wherein the bit map is valid in response to a match between the region snapid and the container snapid.

29. The system of claim 3 wherein the data structure comprises a region relative file block number field, a region relative block number field, and the snapid field.

30. The system of claim 3 further comprising a region snapid configured to store the snapid in response to a region indirect block update.

* * * * *

UNITED STATES PATENT AND TRADEMARK OFFICE
CERTIFICATE OF CORRECTION

| | | |
|---|---|---|
| PATENT NO. | : 7,849,057 B1 | Page 1 of 1 |
| APPLICATION NO. | : 11/694110 | |
| DATED | : December 7, 2010 | |
| INVENTOR(S) | : Michael L. Kazar et al. | |

It is certified that error appears in the above-identified patent and that said Letters Patent is hereby corrected as shown below:

Correct as follows:

In Col. 4, line 66:
    ever, it is expressly contemplated that any appropriate file ~~is~~

Signed and Sealed this

Thirty-first Day of January, 2012

David J. Kappos
*Director of the United States Patent and Trademark Office*